Sept. 5, 1933.  J. COX, JR  1,925,952
GARDENING TOOL
Filed Nov. 7, 1932
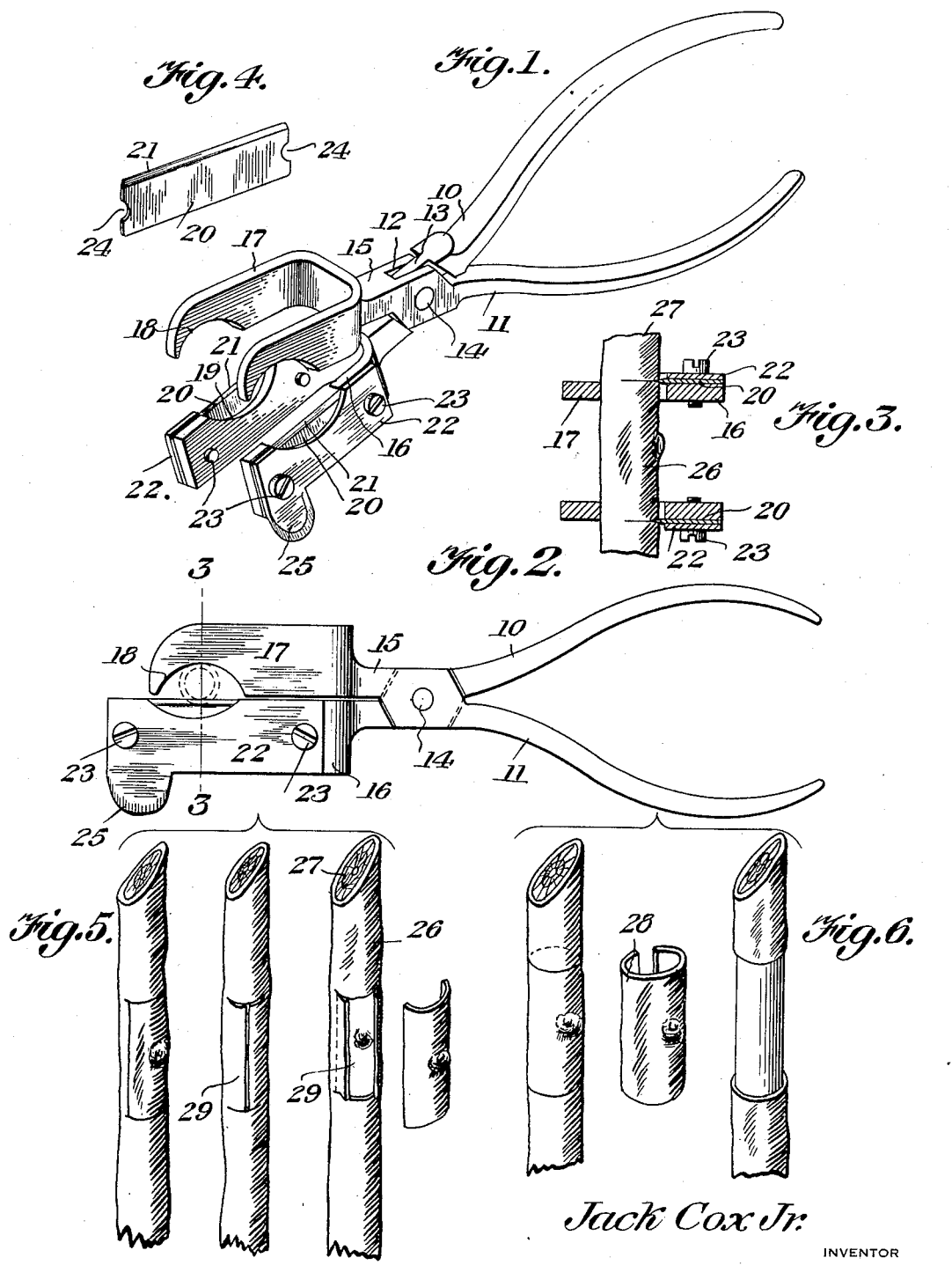
Jack Cox Jr.
INVENTOR
BY Victor J. Evans & Co.
ATTORNEYS Patented Sept. 5, 1933

1,925,952

UNITED STATES PATENT OFFICE 1,925,952

GARDENING TOOL

Jack Cox, Jr., Belton, Tex.

Application November 7, 1932. Serial No. 641,652

1 Claim. (Cl. 47—7)

The invention relates to a tool and more particularly to a gardening or budding tool for plants or the like.

The primary object of the invention is the provision of a tool of this character wherein the same is in the nature of pliers with blades upon one jaw, while the other jaw is recessed to hold a limb of a plant from which the bark is to be cut in the grafting of such plant.

Another object of the invention is the provision of a tool of this character wherein the same will fit the limb of a plant or tree so that a portion or section of its bark can be cut away and in this fashion the bud is then interchangeable, the tool in its make-up being of novel construction and designed particularly for budding, grafting, etc.

A further object of the invention is the provision of a tool of this character which is extremely simple in construction, thoroughly reliable and efficient in its purpose or purposes, strong, durable, readily and easily operated, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claim hereunto appended.

In the accompanying drawing:

Figure 1 is a perspective view of the tool constructed in accordance with the invention, the jaws thereof being in open position.

Figure 2 is a side elevation with the jaws in closed position while by dotted lines is shown a limb or branch of a plant to be cut for removal of a portion of its bark.

Figure 3 is a sectional view on the line 3—3 of Figure 2.

Figure 4 is a perspective view of one of the blades of the tool.

Figure 5 is an exploded perspective view of a plant or tree limbs or branches showing the steps of cutting and removing a portion of its bark.

Figure 6 is a perspective exploded view showing a result in the use of the tool for the budding or grafting of a plant, tree or the like.

Similar reference characters indicate corresponding parts throughout the several views in the drawing.

Referring to the drawing in detail, the tool comprises a pair of arms 10 and 11 respectively, the latter being recessed intermediate of its length as at 12 to accommodate a reduced intermediate companion portion 13 of the arm 10 and these interfitted portions are connected through the medium of a pivot 14 so that the arms 10 and 11 are joined for the opening and closing of the tool in a manner presently described.

The arms 10 and 11 have formed thereon at one side of the pivot 14 the extensions 15 provided with substantially U-shaped jaws 16 and 17 respectively. The jaw 17 has formed at its inner side in the limbs or branches thereof work receiving or holding recesses 18, while the jaw 16 has in its limbs or branches the recesses 19 which are of slightly greater extent than the recesses 18 to expose at the inner side of said jaw 16 removable or replaceable cutting blades 20, these having the cutting edges 21. The blades are held removably or detachably mounted on the jaw 16 through the use of retaining plates 22 and holding screws 23, these being passed through the plates and engaged in notches 24 in opposite ends of each blade 20.

One of the plates 22 has at its outer extreme end and protruded beyond the outer longer edge thereof a cutting lip or tongue constituting a bark splitting blade 25 which functions in the manual manipulation of the tool for the splitting of the bark of a limb or branch of a plant, tree or the like so that a bud can be removed from the limb after it has been cut around the limb.

The recesses 19 exposing the blades 20 function as a gauge to keep the said blades from cutting too deep into the limb.

In the use of the tool the limb or branch of a plant or tree is engaged in the recesses 18 in the jaw 17 by placement of the tool for this purpose and upon actuating the tool the bark 26 upon a limb or branch 27 can be cut into and also such cut bark split by the blade 25 so that the grafting or budding of this growth can be carried forth successfully. Also the section 28 of the bark can be entirely removed from the branch or limb as is shown in Figure 6 of the drawing and this section grafted or patched to another limb or branch for the budding thereof and such section may be termed a ring bud, while in Figure 5 of the drawing, at 29, is shown what might be termed a patch bud.

From the foregoing it is thought that the construction and manner of use of the tool will be clearly understood and therefore a more extended explanation has been omitted.

What is claimed is:

A tool of the character described comprising a pair of crossed pivotally connected arms and interfitted for opening and closing movements, substantially U-shaped jaws extended from the arms, the limbs of one jaw being formed with holding recesses, the limbs of the other jaw being provided with recesses of slightly greater extent than the first named recesses, replaceable cutting blades carried by the limbs of the last named jaw at their outer sides and having their cutting edges bridging the last named recesses, each blade having end notches, and screws carried by the last named jaw and received in said notches.

JACK COX, Jr.